(12) United States Patent
Jasselin

(10) Patent No.: US 7,151,995 B2
(45) Date of Patent: Dec. 19, 2006

(54) METHOD FOR THE PREDICTION OF AIR TRAFFIC EVENTS, ESPECIALLY FOR ASSISTANCE IN DECISION-MAKING FOR AIRLINES AND AIRPORTS

(75) Inventor: Philippe Jasselin, Meudon (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/384,767

(22) Filed: Mar. 11, 2003

(65) Prior Publication Data
US 2004/0039518 A1    Feb. 26, 2004

(30) Foreign Application Priority Data
Mar. 13, 2002   (FR) .................................. 02 03120

(51) Int. Cl.
G06G 7/76        (2006.01)
G06F 19/00       (2006.01)

(52) U.S. Cl. ...................... 701/120; 701/121; 701/122; 701/24; 342/454; 703/22

(58) Field of Classification Search ........ 701/120–122, 701/1, 4, 24, 29, 33, 36, 9, 14, 117; 342/454; 703/22, 24
See application file for complete search history.

(56) References Cited

U.S. PATENT DOCUMENTS

| | | | |
|---|---|---|---|
| 4,196,474 A * | 4/1980 | Buchanan et al. .......... 701/301 |
| 4,520,493 A * | 5/1985 | Heard et al. ................. 375/365 |
| 4,550,318 A * | 10/1985 | Prengaman et al. .......... 342/90 |
| 4,706,198 A * | 11/1987 | Thurman .................... 701/120 |
| 4,899,161 A * | 2/1990 | Morin, Jr. et al. .......... 342/451 |
| 5,070,536 A * | 12/1991 | Mahany et al. .......... 455/67.14 |
| 5,200,901 A * | 4/1993 | Gerstenfeld et al. ........ 701/120 |
| 5,265,023 A * | 11/1993 | Sokkappa .................... 701/120 |
| 5,300,933 A * | 4/1994 | Discenza et al. ............. 342/36 |
| 5,321,615 A * | 6/1994 | Frisbie et al. ................. 701/24 |
| 5,519,618 A * | 5/1996 | Kastner et al. ............. 701/120 |
| 5,659,475 A * | 8/1997 | Brown ........................ 701/120 |
| 5,790,596 A * | 8/1998 | Sexton ........................ 375/228 |
| 6,108,374 A * | 8/2000 | Balachandran et al. ..... 375/227 |
| 6,161,097 A * | 12/2000 | Glass et al. ..................... 705/6 |
| 6,236,899 B1* | 5/2001 | Tsang .......................... 700/90 |
| 6,278,965 B1* | 8/2001 | Glass et al. ................... 703/22 |
| 6,463,383 B1* | 10/2002 | Baiada et al. ............... 701/120 |
| 6,542,810 B1* | 4/2003 | Lai .............................. 701/120 |
| 6,594,524 B1* | 7/2003 | Esteller et al. ................ 607/45 |
| 6,789,011 B1* | 9/2004 | Baiada et al. ............... 701/120 |
| 6,789,031 B1* | 9/2004 | Wang .......................... 702/81 |
| 6,810,322 B1* | 10/2004 | Lai .............................. 701/120 |
| 6,812,890 B1* | 11/2004 | Smith et al. ................. 342/454 |
| 6,839,356 B1* | 1/2005 | Barany et al. ............... 370/401 |
| 6,921,268 B1* | 7/2005 | Bruno et al. ................. 434/323 |
| 6,992,626 B1* | 1/2006 | Smith .......................... 342/454 |
| 7,043,355 B1* | 5/2006 | Lai .............................. 701/120 |

OTHER PUBLICATIONS

Talley et al., ASTA traffic planner system description, Report 4J50-AHD-D001, Martin Marrietta Corp., Management and Data Systems, Dec. 1993.*

Winter et al., Advanced technologies for air traffic flow management, Proc. of an International □□Seminar Organized by Deutsche Forschungsanstalt fur Luft-und Raumfahrt (DLR), Bonn, Germany, Apr. 1994.*

Greenshields, BD.—Quality of traffic transportation, Highway Research Board Proceedings, vol. 34 pp. 608-522, 11Figs. 1955 (from DialogClassic Web—file 63, acc. No. 00227096).*

* cited by examiner

*Primary Examiner*—Cuong Nguyen
(74) *Attorney, Agent, or Firm*—Lowe Hauptman & Berner, LLP

(57) ABSTRACT

In a method for the prediction of air-traffic events, with sending means being distributed on the sites of the air-traffic actors, and with data-processing means communicating with these sending means through at least one communications network, an event is predicted by the processing means as a function of information distributed to the different sites and sent out by the sending means. The method can be applied especially to the optimizing of the management of air traffic, especially during the approach phase and in airports.

18 Claims, 4 Drawing Sheets

METHOD FOR THE PREDICTION OF AIR TRAFFIC EVENTS, ESPECIALLY FOR ASSISTANCE IN DECISION-MAKING FOR AIRLINES AND AIRPORTS

FIELD OF THE INVENTION

The present invention relates to a method for the prediction of air traffic events, and especially for assistance in decision-making for airlines and/or airports. It can be applied especially to the optimizing of flight management by airline companies, the management of air traffic as a whole and airport operations.

BACKGROUND OF THE INVENTION

Many actors play a role in air traffic management. They share common resources consisting especially of the airspace and one or more airport hubs. Of these actors, three groups occupy a vital position:

Air-traffic control;
Airports;
Airlines.

These groups have different tasks and goals. These tasks and goals are sometimes complementary but they can also be contradictory. In particular, traffic control must provide for the security and separation of the flights, while the interest of the airlines is to ensure the best possible use of aircraft. Airports, for their part, apart from being concerned with the security aspects, seek maximum economic efficiency for their installations and more generally seek to receive high traffic.

Delay management is an example illustrating the problems encountered in air traffic or airport traffic. The IATA (International Air Traffic Association) recommends especially that an airline should inform the airport of arrival if it expects a delay of more than 15 minutes. The delay message is transmitted through a dedicated network, by telephone or by fax. However, the airport of arrival does not always know the time at which the aircraft will land. There may even be a domino effect, creating an accumulation of delays. A standard approach may indeed be as follows: technical staff waits at the arrival gate but, as the aircraft has still not arrived, the gate reserved for it is assigned to another aircraft or else the technical staff leaves in order to deal with another flight. The result is that, when the aircraft finally arrives, its reception infrastructure is no longer available. This will lead to an additional delay for the passengers, pending for example the availability of a new gate.

In Europe, certain estimates indicate that about 35% of flights are delayed and that the average delay is about 20 minutes. An average delay of this kind has a major domino effect. In other words, other additional delays, especially reaction times due to a late arrival of the aircraft, will get added to the initial delay and pile up.

SUMMARY OF THE INVENTION

It is an aim of the invention especially to overcome the above-mentioned drawbacks. In particular, it is an aim of the invention to enable more reliable prediction of flight events such as, for example, aircraft arrival and departure times as well as other events. To this end, an object of the invention is a method for the prediction of air-traffic events wherein, with sending means being distributed on the sites of the air-traffic actors, and with data-processing means communicating with these sending means through at least one communications network, an event is predicted by the processing means as a function of information distributed to the different sites and sent out by the sending means.

Advantageously, with a same piece of information Inf.A on an event being sent by different sending means (in the form of data Inf.A1, . . . Inf.Ak, . . . Inf.AN) to the information-processing means, these means assign a quality indicator to the received data, Inf.A1, . . . Inf.Ak, . . . Inf.AN, the prediction of the event being a function of the quality indicator.

The invention also enables the redistribution, to the air-traffic actors, of a same vision of a given situation and a same prediction of air-traffic events. The invention does not require heavy investment especially since the means implemented may be supported by already existing means or infrastructures, especially communications means or infrastructures.

BRIEF DESCRIPTION OF THE DRAWINGS

Other features and advantages of the invention shall appear from the following description made with reference to the appended drawings, of which.

DETAILED DESCRIPTION OF THE INVENTION

Figure 1:
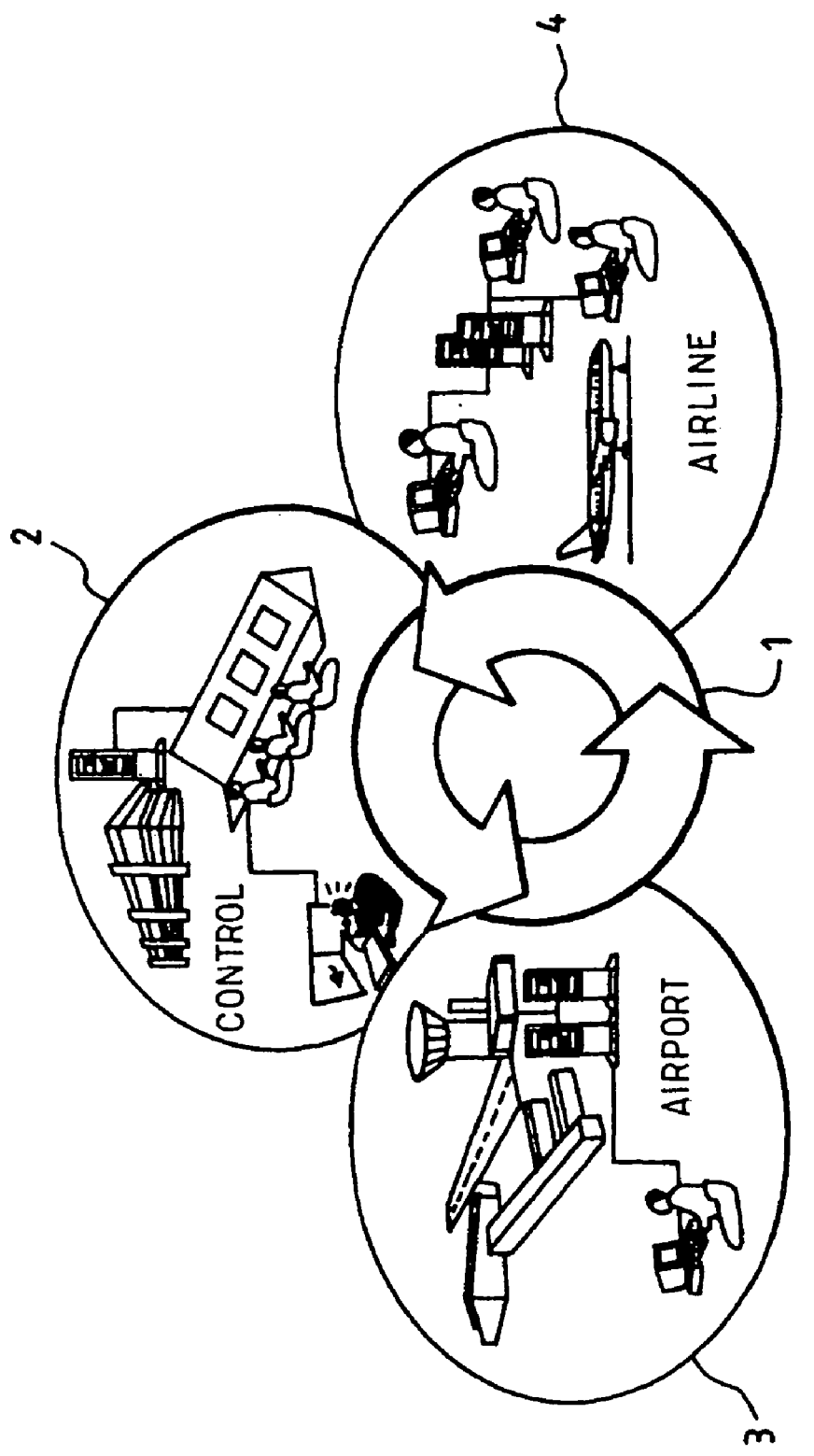
FIG. 1 is an illustration of the operational environment of a method according to the invention.

FIG. 1 illustrates the operational environment of a method according to the invention 1 co-operating with the different air-traffic actors 2, 3, 4. A first actor 2, in particular, is air-traffic control. Air-traffic control takes charge of an aircraft when it is in motion on the ground or in flight, especially during the taxiing, take-off, navigation, approach and landing phases. A second actor 3 is the airport, more generally the entity that is in charge of the entire airport structure which will receive the aircraft, especially the areas for parking and for the transfer of passengers and associated staff. A third actor 4 is the airline including especially ground staff and crew members. In particular, the method according to the invention enables the flow of data between different actors so that they co-operate better and more efficiently. In particular, it enables the different actors to have a same vision of a given situation. According to the invention, an index of quality or non-quality accompanies this vision. Appropriate and better-targeted actions or decisions can therefore be taken by these actors.

Figure 2:
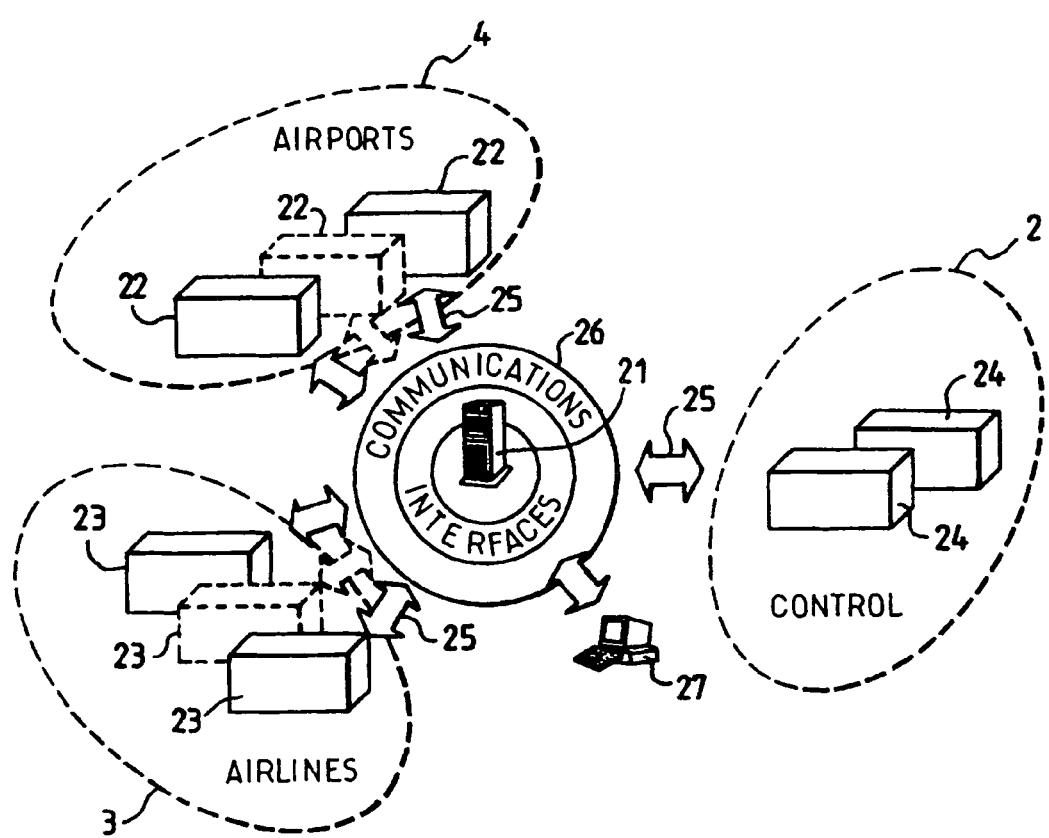
FIG. 2 exemplifies communications between the main elements of a system implementing the invention.

FIG. 2 illustrates an operational communications network of a method according to the invention. The system used comprises information-processing means coupled with information-sending and information-reception means, with one or more communications networks enabling the different entities to exchange information and data. The information-sending and information-reception means are distributed among the sites of the different actors. Thus, a system implementing the invention comprises one or more servers and numerous sending means. In particular, the sending means are, for example, data-extraction mechanisms or customer stations. An exemplary configuration uses a server 21 and customer stations 22, 23, 24 installed on the sites of the different actors. Thus, stations and sending means 22 are installed on the sites of the airports, stations or sending means 23 are installed on the sites of the airlines and stations or sending means 24 are installed on the air-traffic control site. The communications 25 between the servers and the customer stations are obtained for example by Internet or X25 type links. To this end, the server comprises communications and interface software layers 26 to decode and manage the data exchanges. One or more stations 27, linked with the server, are dedicated for example to the administration of the system. For reasons of security and reliability, the server is, for example, backed up by a redundant server. The services of the system are accessed, for example, by means of graphic man-machine interfaces. The customer stations may operate especially on standard, commercially available platforms and the access in this case will be obtained by means of commercially available Internet navigation software.

In the operational phase and especially during the aircraft departure, arrival and stop-over phases, it is generally difficult to plan the operations, particularly for airlines and airports, especially because of the large number and large variety of pieces of information available. For example, numerous estimates are constantly created by the different actors 2, 3, 4 before, during and after each stage of flight. These numerous estimates relate, for example, to the time of arrival and departure of the aircraft. This estimated data will hereinafter be called ETA or "Estimated Time of Arrival", and EOBT "Estimated Off-Block Time". Furthermore, the updating of the different estimates is not synchronized and the quality of the information is difficult to assess. This considerably reduces the possibility for airport and airline staff of using these estimates for the efficient management of the effects of delays and related problems. Critical uses of flight estimation data are chiefly made by flight management teams and airline teams including, especially, staff responsible for stop-overs, flight planning staff, airline network coordinators and the gate and parking managers who are especially responsible for drawing up the most efficient operational plans. A system according to the invention carries out especially operations for the picking up, merger and correlation of estimates of operations and flight data coming from the different airports, airlines and air-traffic controllers and advantageously provides information that is enriched, and therefore surer and more reliable.

Figure 3:
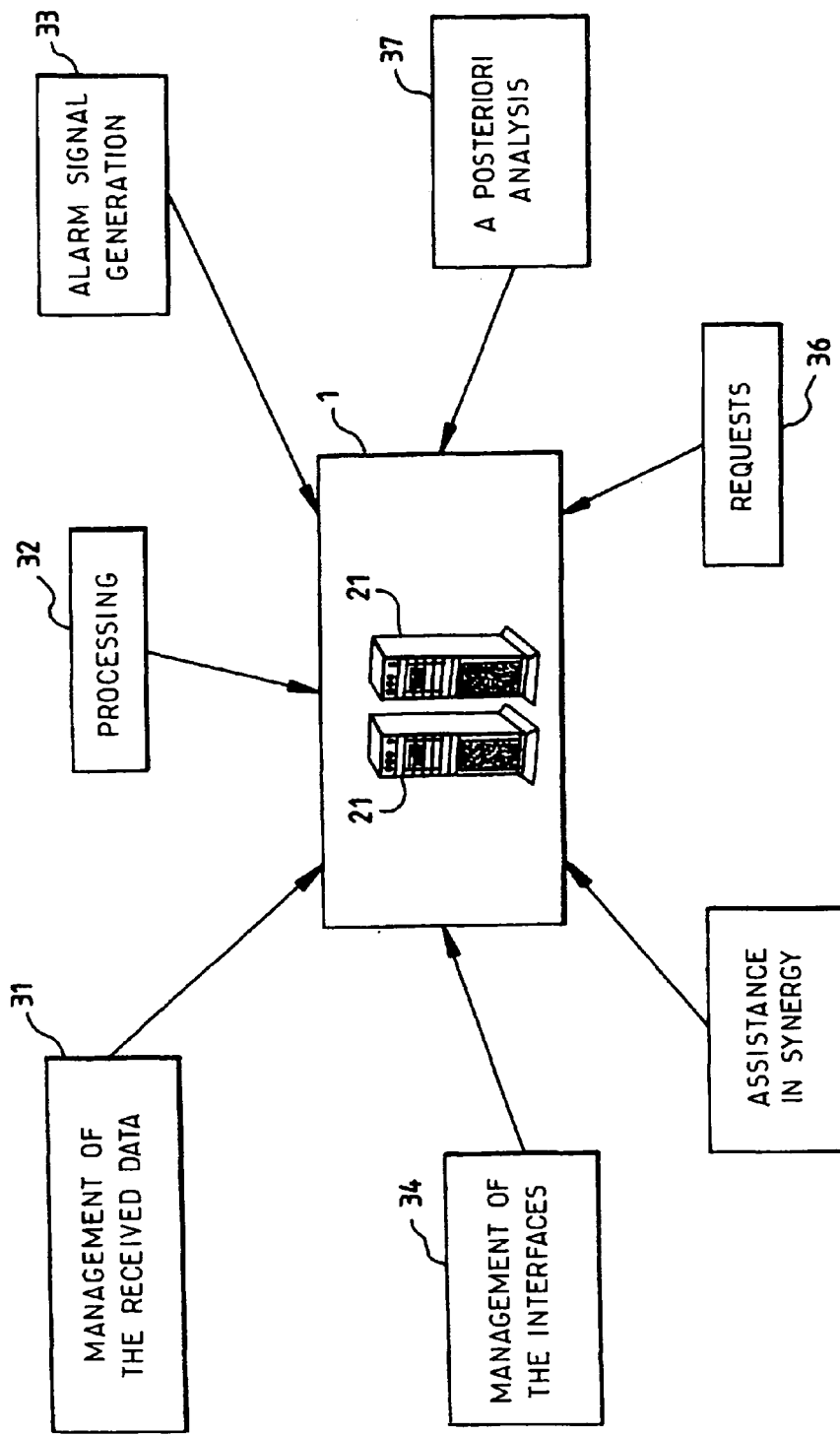
FIG. 3 shows an exemplary software architecture of processing means for the implementation of the invention.

FIG. 3 illustrates a possible architecture of the information-processing means for the implementation of the method according to the invention. FIG. 3 more particularly illustrates a functional subdivision of the different possible units of these processing means. This is a functional subdivision, and the blocks described hereinafter are especially functions that may be implemented on a same machine or on several information-processing machines 21.

A first block 31 manages the data streams received from the different sending means of the actors 2, 3, 4. To this end, it comprises input interfaces and controls over the stream of information received. It extracts and filters the crude data and translates the different data formats received from the sending means into a unified model proper to the system. This data may also be sent by the customer stations 22, 23, 24 installed on the platforms of the actors. The instant of arrival of each piece of data received is, for example, stored by this block.

A second block 32 processes the data received from the block 31 which is then analyzed by appropriate means. These appropriate means assign a quality indicator to each piece of data received. This function shall hereinafter be called a quality indication function. The quality indicator especially depends on the origin of the data received. It may also depend on the environment of the flights, especially the flight phases or particular conditions of operation. These criteria are then advantageously taken in combination.

To define a quality indicator, several categories of criteria may be used. The final indicator, for example, may be the combination of the different indices. This final indicator may take the form of a weighting function. A first index $I_1$ is, for example, a function of the data itself. Thus, this index is itself a function of several criteria. A criterion is, for example, related to the age of the data. The older a piece of data, the lower is its quality index. This decrease as a function of time may be continuous or it may vary in stages. Another criterion that influences this first index is, for example, the stability of a piece of data as a function of time. The greater the variation, as a function of time, of the information contained in a piece of data, the more the quality of this piece of data diminishes. This stability may be defined by the level of variation of the piece of data in a given time interval. For example, if we choose the above two criteria to form the index $I_1$ proper to a piece of data, this index may be defined as a point in time t by the following relationship:

$$I_1 = A(t-t_0) \times S(t) \quad (1)$$

where:

$A(t-t_0)$ is a normalized function decreasing as a function of the duration $t-t_0$, to being the instant of acquisition of the piece of data memorized as indicated, for example, here above;

$S(t)$ is a function defining the stability of the data at the instant t.

The functions $A(t-t_0)$ and $S(t)$ are, for example, normalized so that the index $I_1$ ranges, for example, from 0 to 1.

Another index $I_2$ which may play a role in the definition of the quality indicator takes account of the criteria of overall level, i.e. especially the total vision of the actors for each piece of information. This index $I_2$ is a function especially of the set data, from different sources, defining a same piece of information. It is, for example, a function of correlation of this data. To illustrate this index, we may consider for example the data indicating the arrival time of a flight. The quality indication function analyses the different pieces of arrival time data given by the different actors relating to a given flight. If there is a high correlation between the arrival times indicated, the quality indication function then assigns a high value to the index $I_2$. Thus this index $I_2$ for a given piece of information inf. may be defined by the following relationship:

$$I_2 = C[(inf.1), \ldots (inf.k), \ldots (inf.N)] \quad (2)$$

where C is a correlation function and inf.k, k ranging from 1 to N, is a piece of data received from the actor k to define the information inf., this information being, for example, the arrival time of a flight. If all the pieces of data inf.1, . . . inf.k, . . . inf.N are near, then the quality index assigned to each of these pieces of data will be high. This will be the case especially if all the actors indicate substantially the same arrival time for a given flight. As in the above index, this index $I_2$ is for example normalized.

Another quality index $I_3$ may be used to take account of the flight phase, and more generally the flight environment. In particular, this index associates the flight phase and the origin of the data. Thus, this index takes account of the fact that, when an aircraft is in the flight phase, under air-traffic control, it is the air-traffic control that will deliver the most reliable information. If, on the contrary, when the aircraft is in the ground stop-over phase, the airport stop-over management staff and systems have the best information. A weighting of the information can then be obtained as a function of the pair of pieces of information on the flight phase and the origin of the information. More particularly, the index $I_3$ assigned to a piece of data depends on the flight phase and the origin of this piece of data. When the aircraft is, for example, in the flight, approach or landing phase, the index $I_3$ of a piece of information is high if it comes from air-traffic control and it is low if it comes from the departure airport. When the aircraft is on the ground, the index $I_3$ is high if the information comes from the stop-over management systems of the airport in which the aircraft is located. As an example, we may consider the information relating to the estimated time of arrival or ETA.

On the whole, the quality indicator is the combination of all the indices used. If there are three types of index for example, this indicator I is, for example, defined as follows:

$$I = I_1 \times I_2 \times I_3 \quad (3)$$

This indicator I is defined at a point in time t; it is then a function of the time.

In Europe, the CTOT information on take-off is given by the CFMU (Central Flow Management System) hence given by air-traffic control. The server of a system according to the invention therefore receives this information from air-traffic control. Furthermore, from the airline, it receives flight plan data, and especially the expected flying time FT. From this information, the system then simply deduces a piece of information on estimated time of arrival ETA. By applying an operation model and airport data, the system deduces that ETA=CTOT+FT+TR where TR is the taxiing time at the airport of arrival.

For its part, the airport of arrival indicates an estimated time of arrival ETA'. If ETA is different from ETA' by a fixed value, the method according to the invention detects an inconsistency in data. By considering the quality indicator I from the indices $I_1$, $I_2$, $I_3$ that form it, the method according to the invention may estimate the most reliable of these two pieces of information. To illustrate this result in a simple way, the invention takes account of the index $I_3$ as defined here above, independently of the other indices $I_1$, $I_2$. Depending on the flight phase, the system will assign greater reliability to one piece of data or the other. Typically, if the aircraft is in a taxiing phase at the airport of departure, it means that it is complying with the CTOT given by the CFMU and it is the ETA data that will have the best index of quality and that will therefore be chosen. Quite clearly, the final indicator takes account of the other indices $I_1$, $I_2$ which take account especially of the age of the piece of data, its stability and its correlation between the different sources. This example shows that a piece of information can be given directly by a source, by the ETA' data for example. It can also be given indirectly by one or more sources, for example by the piece of data on CTOT given by air-traffic control, by the piece of data on FT given by the airline and by the expected taxiing time given by the airport of arrival to form ETA.

In the data quality indicator, criteria different from or additional to those that have just been mentioned may come into play. In particular, it is possible to bring into play criteria linked to weather conditions or traffic control conditions. The quality indicator may comprise the above-mentioned indices $I_1$, $I_2$, $I_3$, but it may also comprise only one or two of these indices, just as it may comprise others.

Figure 4:
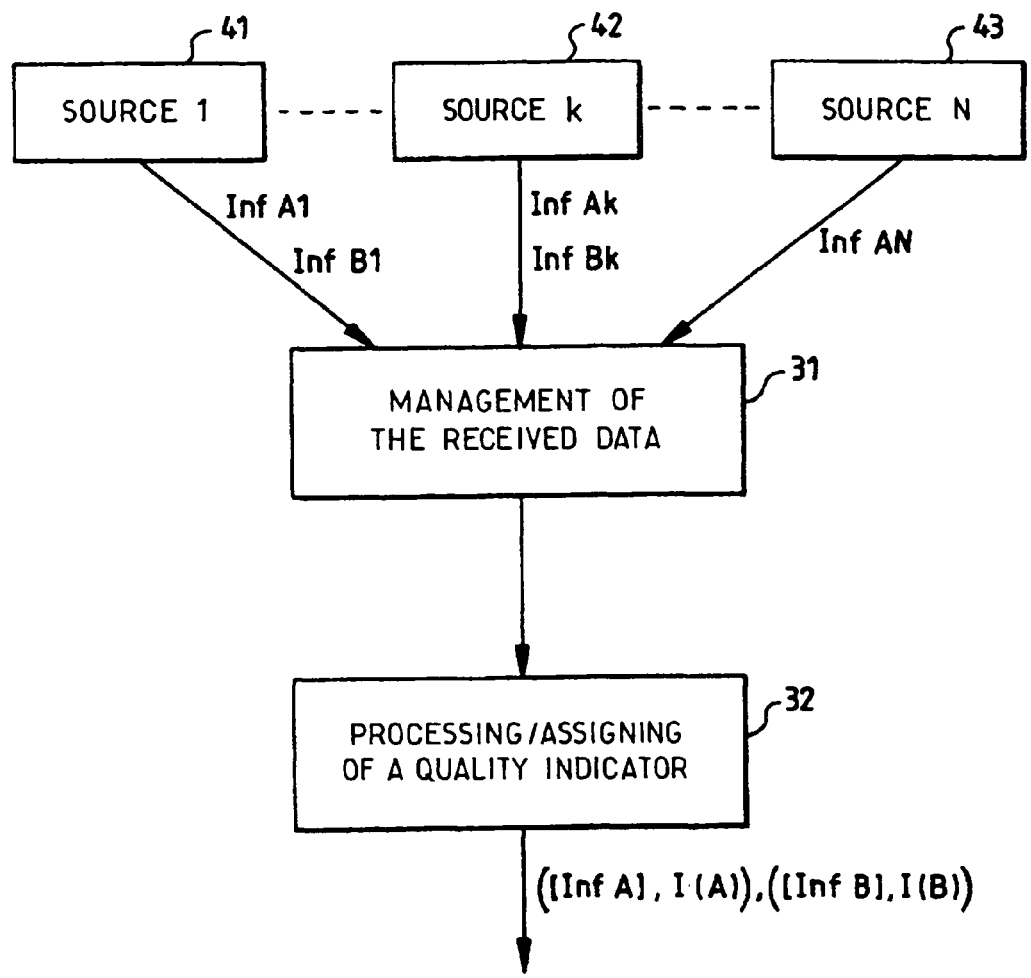
FIG. 4 illustrates the assigning of a quality indicator to the data received from the different sites.

FIG. 4 is a block diagram illustrating the data-processing operations performed by a method according to the invention from their sources up to the above-mentioned processing unit 32. The data, which convey information, come from different sources 41, 42, 43, for example N in number. These sources are distributed on the site of the above-mentioned actors 2, 3, 4, namely among the airlines, the airports and the air-traffic control organizations, it being known that other actors can be considered. The sources take the form, for example, of data-extraction means, sending means or customer stations 22, 23, 24 implemented at the sites of the actors described here above. For example, FIG. 4 illustrates the data streams pertaining to two pieces of information Inf.A and Inf.B. Inf.A is, for example, an instant of take-off of an aircraft and Inf.B is an instant of arrival, actually a time of arrival of the aircraft at a gate. This information is given by several sources. A piece of data representing the information Inf.A coming from the source k is referenced Inf.Ak. Similarly, a piece of data representing the information Inf.B coming from the source k is referenced Inf.Ak. This data is picked up and pre-processed by the received-data management unit 31 as indicated here above, and the unit 32 assigns a quality indicator, I(A), I(B) respectively, to each piece of information Inf.A, Inf.B. The information Inf.A is given, for example, given by the set [Inf.A]={Inf.A1, ... Inf.Ak, ... Inf.AN} of the received data representing this information and coming from the different sources 41, 42, 43. Each piece of data received Inf.Ak is accompanied by its quality indicator, the set of these indicators $\{I_{A1}, \ldots I_{Ak}, \ldots I_{AN}\}$ forming the composite, overall indicator I(A) of the information Inf.A. For each piece of data Inf.Ak received, the function that assigns the quality indicator determines, for example, the intermediate indices that constitute it, $I_1$, $I_2$, $I_3$ as defined here above. These intermediate indices form the quality indicator $I_{Ak}$ associated with the data Inf.Ak. The process is the same, starting from the data Inf.B1, ... Inf.Bk for the piece of information Inf.B. The processing block 32 can then prepare enriched data ([Inf.A], I(A)), ([Inf.B], I(B)) which will be distributed to the actors 2, 3 and 4 or to only certain of these actors. The processing unit controls, especially, the sending of the information to the different actors, according to their requirements. For example, it controls the dispatch, to the airport and airline company concerned, of the landing time of an aircraft or the time of arrival of the aircraft at the gates. This information given depend especially on the above-mentioned quality indicators.

There are several possible solutions to predicting a piece of information as a function of the quality indicators. In a first approach, the prediction chosen for a piece of information Inf.A is the received data that contains the best quality indicator among the pieces of data Inf.A1, ... Inf.Ak, ... Inf.AN defining this information, for example Inf.Ak in the previous case, $I_{Ak}$ then being the quality indicator with the greatest relative value. In a second approach, the quality indicators associated with each piece of data Inf.A1, ... Inf.Ak, ... Inf.AN act as a weighting function. For example, the above-mention piece of information Inf.A may be given by the following relationship:

$$Inf.A^* = I_{A1}.Inf.A1 + \ldots I_{Ak}.Inf.Ak + \ldots I_{AN}.Inf.AN \quad (4)$$

Inf.A represents the prediction of the information Inf.A. It is the sum of the data received Inf.A1, ... Inf.Ak, ... Inf.AN weighted by their quality indicators. The indicators $I_{A1}, \ldots I_{Ak}, \ldots I_{AN}$ are, for example, normalized and defined in such a way that $I_{A1} + \ldots I_{Ak} + \ldots I_{AN} = 1$. These indicators form weighting coefficients.

To illustrate the processing carried out by a method according to the invention, we consider the example of the ETA information referred to here above, indicating the estimated time of arrival of a flight. To simplify the description, we shall consider three sources of information, the airline for the flight concerned, the airport of arrival and the air-traffic control. The information from these sources will respectively be indexed 1, 2 and 3. The airport of arrival gives the data $ETA_2$. The air-traffic control gives the information on take-off $ETOT_3$. The airline gives the flight plan and therefore the flying time $FT_1$. The processing unit 32 computes the quality indicator $I_{42}$ of the data $ETA_2$ according to the criteria chosen. Similarly, it computes the quality indicators $I_{A1}$, $I_{A3}$ of the data $FT_1$ and $ETOT_3$. This operation is repeated, for example, several times, especially in flight. In the present case, the arrival of the flight is given in two ways, directly by the data $ETA_2$ and indirectly by $FT_1$ and $ETOT_3$, then $FT_1+ETOT_3$ gives another estimation of time of arrival referenced $ETA_{13}$. It is possible to obtain an indicator of quality $I_{13}$ which is the indicator that is the average of $I_{A1}$ and $I_{A3}$. At the different phases of the path of the aircraft, the values of $ETA_2$ or $ETA_{13}$ will be chosen as a function of the value of the quality indicators $I_{42}$ and $I_{13}$. In another approach it is possible, in accordance with the relationship (4), to choose an arrival time ETA based on the prediction $ETA^*=I_{42}.ETA_2+I_{13}.ETA_{13}$. The quality indicators $I_{42}$, $I_{13}$ depend on the phase of the flight, i.e. before, during or after. For example if, at a point in time t, $I_{42}=0.2$ and $I_{13}=0.8$ and if $ETA_2=16.00$ hours and $ETA_{13}=16.30$ hours, the time of arrival chosen as the arrival time will be 16.30 hours according to the first approach or ETA according to the second approach, ETA* being equal to 0.2×16+ 0.8×16.5=16.4, giving an expected time of arrival at 16.24 hours.

Returning to FIG. 3, a functional bloc 33 generates alarms, for example. These alarms are designed especially for the different air-traffic actors and are transmitted, for example, to the customer stations. This unit takes account, for example, of the data given by the processing unit 32. In the event of inconsistency detected in the received data, the units 33 generates, for example, a warning signal for the actors. An example of inconsistency is, for example, a major difference between two received pieces of data: this will be the case, for example, if the above-defined index $I_2$ is bad for the data Inf.A1, . . . Inf.Ak, . . . Inf.AN attached to one and the same piece of information. In this case, the correlation between this data is very low and the function defined by the relationship (2) is, for example, below a given threshold. A unit 34 manages the interfaces and it verifies especially the fact that the data sent to the customer stations are in the right format with respect to the communications protocols used. A method according to the invention improves the synergy between the different actors of the air-traffic control system. In particular, it enables working in collaboration or team work. This result is further improved by a unit 35 which gives additional assistance in collaborative decision-making. In particular, this unit supplies the customer stations with user-friendly text providing particular characteristics, for example, in order to identify a given flight or a group of given flights which are, for example, connecting flights. It may furthermore supply vocal communications channels. All this sent data enables the different actors concerned to have a same vision of a given air-traffic situation. A unit 36 enables the different users, from the customer stations, to make requests on the set or a subset of the data processed by the system, especially at the server or servers. A programming interface especially enables the users to make the request in a simple way without intensive knowledge of any specialized computer language, for example a language of the SQL type. Another unit 37 enables an a posteriori analysis of the traffic situations recorded and filed by the system. In particular, this function enables the extraction of the stored data and provides statistical analysis tools. Statistical indicators on air traffic or the quality of the collaboration between the air traffic actors can thus be sent to the actors or edited for their attention. This unit can furthermore provide an automatic report including air traffic trends, for example a report on the progress of the delays or other air-traffic events.

The supervision and the administration of the system are carried out, for example, at the server or servers 21. In particular, several modes of functioning are planned, in addition to the operational mode. These modes are, for example, maintenance, stopping or "standby".

The customer stations have, for example, access solely to useful or critical data. Their links to the server 21 of the system are, for example, two-way links since data can be given to the server by these same customer stations, with a system according to the invention making judicious use of all the information distributed among the different air-traffic actors. The hardware infrastructure needed for all these exchanges may be a standard infrastructure. This is the case especially for computers and screens. The customer stations may be dedicated to the implementation of the method according to the invention or they may share their resources with other stations having other applications. The communications means used between the server or servers 21 and the customer stations are compatible with the requirements of performance, safety and air-traffic control. To this end, these communications means include existing and future technological standards for air transportation such as, for example, private or secured public Internet type networks as well as the XML/HTTP data exchange standard.

In the exemplary implementation of the invention described here above, the processing means that make the prediction are located in one or more servers 21, i.e. in fact they are positioned in a centralized way. In another exemplary implementation of the invention, the prediction of the events can be done in a decentralized way, for example at the sites of the different actors. The central system, for example the server 21, then delivers the pieces of information to the different actors accompanied by their quality indicator. The actors can then process this information as they wish. To this end, the processing means 32, which compute the prediction, are then implemented on the hardware of the actors' sites. All the same, the fact is that all the actors always have a same vision of a given traffic situation, this vision being defined especially by the sharing of the piece of information with, for example, their quality indicators assigned to them.

What is claimed is:

1. A method of predicting air-traffic events comprising the steps of:

communicating between sending means distributed on the sites of air-traffic actors with data-processing means through a communications network predicting an event as a function of information distributed to the different sites and sent out by the sending means, wherein with a same piece of informatiom (Inf.A) on an event being sent by different sending means in the form of data (Inf.A1, . . . Inf.Ak, . . . Inf.AN), to the information-processing means, these means assign a quality indicator to the received data (Inf.A1, . . . Inf.Ak, . . . Inf.AN), the prediction of the event being a function of the quality indicator, wherein the quality indicator comprises an index $I_2$ as a function of the set of data (Inf.A1, . . . Inf.Ak, . . . Inf.AN), of different origins, which define a same piece of information, wherein each of the air-traffic actors takes the quality indicator into consideration when using the data (Inf.A1 . . . Inf.Ak . . . Inf.AN).

2. The method according to claim 1, wherein the communications network is an Internet type network.

3. The method according to claim 1, wherein the quality indicator comprises an index $I_1$ as a function of the data itself.

4. The method according to claim 3, wherein the index $I_1$ is a function of the age of the data, the older the data the lower being the index.

5. The method according to claim 3, wherein the index $I_1$ is a function of the stability of the data as a function of the time.

6. The method according to claim 2, wherein the data exchanges are done according to the XML/HTTP standard.

7. The method according to claim 1, wherein the prediction is made by the processing means.

8. The method according to claim 1, wherein the quality indicator comprises an index $I_3$ as a function of the flight environment.

9. The method according to claim 8, wherein the index $I_3$ is a function of the flight phase.

10. The method according to claims 8, wherein the index $I_3$ is a function of the source of the data (Inf.A1, . . . Inf.Ak, . . . Inf.AN).

11. The method according to claim 9 wherein, for a piece of data, the index $I_3$ is a function of the pair of pieces of information on flight phase and origin of the data.

12. The method according to claim 1, wherein the prediction chosen for an piece of information (Inf.A) is the received data defining this information which comprises the best quality indicator.

13. The method according to claim 1, wherein the prediction chosen for a piece of information (Inf.A) is the sum of the data received (Inf.A1, . . . Inf.Ak, . . . Inf.AN) defining this information weighted by their quality indicators.

14. The method according to claim 1, wherein an alarm is generated in the event of inconsistency of the received data (Inf.A1, . . . Inf.Ak, . . . Inf.AN) pertaining to a same piece of information.

15. The method according to claim 14, wherein the alarm is generated in the event of low correlation of the data received.

16. The method according to claim 1, wherein the processing means are distributed in one or more servers.

17. The method according to claim 1, wherein the sending means are data-extraction mechanisms or customer stations.

18. The method according to claim 1, wherein the prediction is decentralized and made by processing means decentralized at the sites.

* * * * *